US 10,389,186 B2

(12) United States Patent
Tang et al.

(10) Patent No.: US 10,389,186 B2
(45) Date of Patent: Aug. 20, 2019

(54) EXTERNAL ROTOR MOTOR AND DRAUGHT FAN COMPRISING THE SAME

(71) Applicant: ZHONGSHAN BROAD-OCEAN MOTOR CO., LTD., Zhongshan (CN)

(72) Inventors: Songfa Tang, Zhongshan (CN); Shikun Chen, Zhongshan (CN); Qingmei Jiao, Zhongshan (CN)

(73) Assignee: ZHONGSHAN BROAD-OCEAN MOTOR CO., LTD., Zhongshan (CN)

(*) Notice: Subject to any disclaimer, the term of this patent is extended or adjusted under 35 U.S.C. 154(b) by 71 days.

(21) Appl. No.: 15/854,701

(22) Filed: Dec. 26, 2017

(65) Prior Publication Data
US 2018/0123405 A1 May 3, 2018

Related U.S. Application Data

(63) Continuation-in-part of application No. PCT/CN2015/084275, filed on Jul. 16, 2015.

(30) Foreign Application Priority Data

Jul. 4, 2015 (CN) .................... 2015 2 0485974 U

(51) Int. Cl.
H02K 1/12 (2006.01)
H02K 1/27 (2006.01)
(Continued)

(52) U.S. Cl.
CPC ................ H02K 1/12 (2013.01); H02K 1/27 (2013.01); H02K 1/2786 (2013.01); H02K 5/16 (2013.01);
(Continued)

(58) Field of Classification Search
CPC .. H02K 1/27; H02K 5/16; H02K 5/20; H02K 5/22; H02K 7/08; H02K 7/14; H02K 9/06;
(Continued)

(56) References Cited

U.S. PATENT DOCUMENTS

2007/0228860 A1* 10/2007 Rao .................... H02K 1/12
310/156.37
2014/0183983 A1* 7/2014 Huang ................. H02K 3/28
310/43
2016/0238105 A1* 8/2016 Moore ................. F16H 1/10

FOREIGN PATENT DOCUMENTS

CN 203071709 U 7/2013
CN 203504359 U 3/2014
(Continued)

Primary Examiner — Naishadh N Desai
(74) Attorney, Agent, or Firm — Matthias Scholl P.C.; Matthias Scholl

(57) ABSTRACT

An external rotor motor, including: a front end cover; a rear end cover; a sleeve casing; a rotary shaft; a stator assembly; and an external rotor assembly. The front end cover includes a first bearing chamber in which a front bearing is disposed. The front end cover and the rear end cover are disposed at two ends of the sleeve casing, respectively. The external rotor assembly is disposed on and integrated with the rotary shaft. The rear end cover includes a cover body and a sleeve base. The sleeve base includes a second bearing chamber in which a rear bearing is disposed. The external rotor assembly is disposed in the sleeve casing and sleeves the stator assembly. The rotary shaft includes a head, a middle part, and a tail. The tail of the rotary shaft is supported by the rear bearing on the rear end cover.

20 Claims, 14 Drawing Sheets

(51) Int. Cl.
    *H02K 5/16*    (2006.01)
    *H02K 5/20*    (2006.01)
    *H02K 5/22*    (2006.01)
    *H02K 7/14*    (2006.01)
    *H02K 9/06*    (2006.01)
    *H02K 7/08*    (2006.01)
    *H02K 5/173*   (2006.01)

(52) U.S. Cl.
    CPC .............. *H02K 5/1735* (2013.01); *H02K 5/20* (2013.01); *H02K 5/22* (2013.01); *H02K 7/085* (2013.01); *H02K 7/14* (2013.01); *H02K 9/06* (2013.01); *H02K 5/225* (2013.01)

(58) Field of Classification Search
    CPC ........ H02K 1/12; H02K 7/085; H02K 1/2786; H02K 5/1735; H02K 5/225
    USPC ....................................................... 310/67 R
    See application file for complete search history.

(56) References Cited

FOREIGN PATENT DOCUMENTS

| | | |
|---|---|---|
| CN | 203660692 U | 6/2014 |
| CN | 203775003 U | 8/2014 |
| JP | 2000-166146 A | 6/2000 |

\* cited by examiner

EXTERNAL ROTOR MOTOR AND DRAUGHT FAN COMPRISING THE SAME

CROSS-REFERENCE TO RELATED APPLICATIONS

This application is a continuation-in-part of International Patent Application No. PCT/CN2015/084275 with an international filing date of Jul. 16, 2015, designating the United States, now pending, and further claims foreign priority benefits to Chinese Patent Application No. 201520485974.3 filed Jul. 4, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The disclosure relates to an external rotor motor and a draught fan comprising the same.

Description of the Related Art

Per unit volume, an external rotor motor outputs more torque and is less expensive than an inner rotor motor. Conventional electric appliances mainly employ inner rotor motors, so there is a need to replace the inner rotor motors with external rotor motors. However, existing external rotor motors are totally different from the inner rotor motor in structure and installation methods. Thus, it is urgent to develop a novel external rotor motor compatible with conventional electric appliances.

SUMMARY OF THE INVENTION

In view of the above-described problems, it is one objective of the invention to provide an external rotor motor that can be used to directly substitute for an inner rotor motor, so as to improve the product performance of the electric appliances.

It is another objective of the invention to provide a draught fan comprising the abovementioned external rotor motor.

To achieve the above objectives, in accordance with one embodiment of the invention, there is provided an external rotor motor, comprising: a front end cover; a rear end cover; a sleeve casing; a rotary shaft; a stator assembly; and an external rotor assembly. The front end cover comprises a first bearing chamber in which a front bearing is disposed; the front end cover and the rear end cover are disposed at two ends of the sleeve casing, respectively; the external rotor assembly is disposed on and integrated with the rotary shaft; the rear end cover comprises a cover body and a sleeve base protruding upwards from the cover body; the sleeve base comprises a second bearing chamber in which a rear bearing is disposed; the stator assembly sleeves the sleeve base; the external rotor assembly is disposed in the sleeve casing and sleeves the stator assembly; the rotary shaft comprises a head, a middle part, and a tail; the tail of the rotary shaft is supported by the rear bearing on the rear end cover; the middle part of the rotary shaft is supported by the front bearing on the front end cover; and the head of the rotary shaft extends out of the front end cover to form a shaft extension connected to a load.

In a class of this embodiment, the stator assembly comprises a stator core, a terminal insulator, and coil windings; a through hole is provided in a center of the stator core, the sleeve base is disposed in the through hole, and the stator assembly is integrated with the rear end cover and is packaged by a plastic-packaged body.

In a class of this embodiment, the external rotor assembly comprises a sleeve and a plurality of permanent magnets; the sleeve comprises a side wall, a top plate, a chamber formed by the side wall, and a bottom opening; the plurality of permanent magnets is circumferentially disposed on the side wall; an axle hole is disposed in a center of the top plate; and the middle part of the rotary shaft is disposed in the axle hole and is integrated with the sleeve.

In a class of this embodiment, the front end cover and the rear end cover are connected to one another via a bolt and nut mechanism, and are disposed on two ends of the sleeve casing, respectively.

In a class of this embodiment, a control box comprising a control circuit board is disposed on the rear end cover.

In a class of this embodiment, an auxiliary casing is disposed between the rear end cover and the control box; and a side wall of the auxiliary casing is provided with an air inlet.

In a class of this embodiment, the rear end cover comprises ventilating slots, the sleeve casing comprises air outlets, the ventilating slots communicate with chambers of the auxiliary casing and the sleeve casing, and the external rotor assembly comprises air blades.

In a class of this embodiment, a part of electronic elements of the control circuit board extend out of the control box to enter the chamber of the auxiliary casing.

In a class of this embodiment, the control box is connected to and mounted with the rear end cover via a bolt; the control box comprises a fourth step stop, the rear end cover is provided with a third step stop, and two ends of the auxiliary casing are embedded in the third step stop and the fourth step stop, respectively.

In a class of this embodiment, the front end cover comprises a first step stop, the rear end cover comprises a second step stop, and two ends of the sleeve casing are embedded in the first step stop and the second step stop, respectively.

In a class of this embodiment, a part of each air blade is located on a surface of the top plate, and the other part of each air blade is located on a surface of an outer wall of the sleeve.

In a class of this embodiment, the top plate comprises a plurality of ventilation holes.

Another embodiment of the invention provides a draught fan, comprising: a volute comprising an air inlet, an external rotor motor, a wind wheel, and a plurality of installing supports. The volute comprises a chamber and the wind wheel is disposed in the chamber; the plurality of installing supports is close to the air inlet of the volute; one end of the plurality of installing supports is connected to the volute, and the other end of the plurality of installing supports is connected to the sleeve casing of the external rotor motor; and the shaft extension of the rotary shaft extends out of the front end cover and connects to the wind wheel.

Advantages of the external rotor motor and the draught fan according to embodiments of the invention are summarized as follows:

1. The front end cover and the rear end cover are disposed at two ends of the sleeve casing, respectively; the external rotor assembly is disposed on and integrated with the rotary
} shaft; the rear end cover comprises a cover body and a sleeve base protruding upwards from the cover body; the sleeve base comprises a second bearing chamber in which a rear bearing is disposed; the stator assembly sleeves the sleeve base; the external rotor assembly is disposed in the sleeve casing and sleeves the stator assembly; the rotary shaft comprises a head, a middle part, and a tail; the tail of the rotary shaft is supported by the rear bearing on the rear end cover; the middle part of the rotary shaft is supported by the front bearing on the front end cover; and the head of the rotary shaft extends out of the front end cover to form a shaft extension connected to a load.

In this way, the external rotor motor can be used to directly replace the inner rotor motor without changing the installation method of the motor. The external rotor motor has the advantages of convenient and simple installation, and can greatly improve the product performance The external rotor is supported by the front end cover and the rear end cover, has a relatively long axial length, which is conducive to the stable operation of the external rotor.

2. The stator assembly is integrated with the rear end cover and is packaged by a plastic-packaged body. This improves the integrity, insulation, and the waterproof and moistureproof properties of the motor, and is conducive to installation.

3. The control box is connected to and mounted with the rear end cover via a bolt; the control box comprises a fourth step stop, the rear end cover is provided with a third step stop, and two ends of the auxiliary casing are embedded in the third step stop and the fourth step stop, respectively. The front end cover comprises a first step stop, the rear end cover comprises a second step stop, and two ends of the sleeve casing are embedded in the first step stop and the second step stop, respectively. This facilitates the assembly of the motor.

4. The auxiliary casing is disposed between the rear end cover and the control box; and the side wall of the auxiliary casing is provided with the air inlet. The rear end cover comprises ventilating slots, the sleeve casing comprises air outlets, the ventilating slots communicate with chambers of the auxiliary casing and the sleeve casing, and the external rotor assembly comprises air blades. A part of electronic elements of the control circuit board extend out of the control box to enter the chamber of the auxiliary casing. When the rotor rotates, the external cold air flows through the air inlet on the side wall of the auxiliary casing, passes through the ventilation slots on the rear end cover, enters the chamber of the sleeve casing, and then flows out of the sleeve casing via the air outlet. This cools the electronic components on the circuit board and the stator assembly, presenting good cooling effect.

5. The auxiliary casing is disposed between the rear end cover and the control box. This increases the volume of the control box, improves the cooling effect, and the motor structure is more compact.

6. A part of each air blade is located on a surface of the top plate, and the other part of each air blade is located on a surface of an outer wall of the sleeve. The top plate comprises a plurality of ventilation holes. This accelerates the circulation and convection of the air, and speeds up the heat dissipation.

7. The draught fan comprises a volute, an external rotor motor, a wind wheel and a plurality of installation supports. The draught fan features a relatively high product performance.

BRIEF DESCRIPTION OF THE DRAWINGS

The invention is described hereinbelow with reference to the accompanying drawings, in which.

DETAILED DESCRIPTION OF THE EMBODIMENTS

Figure 1:
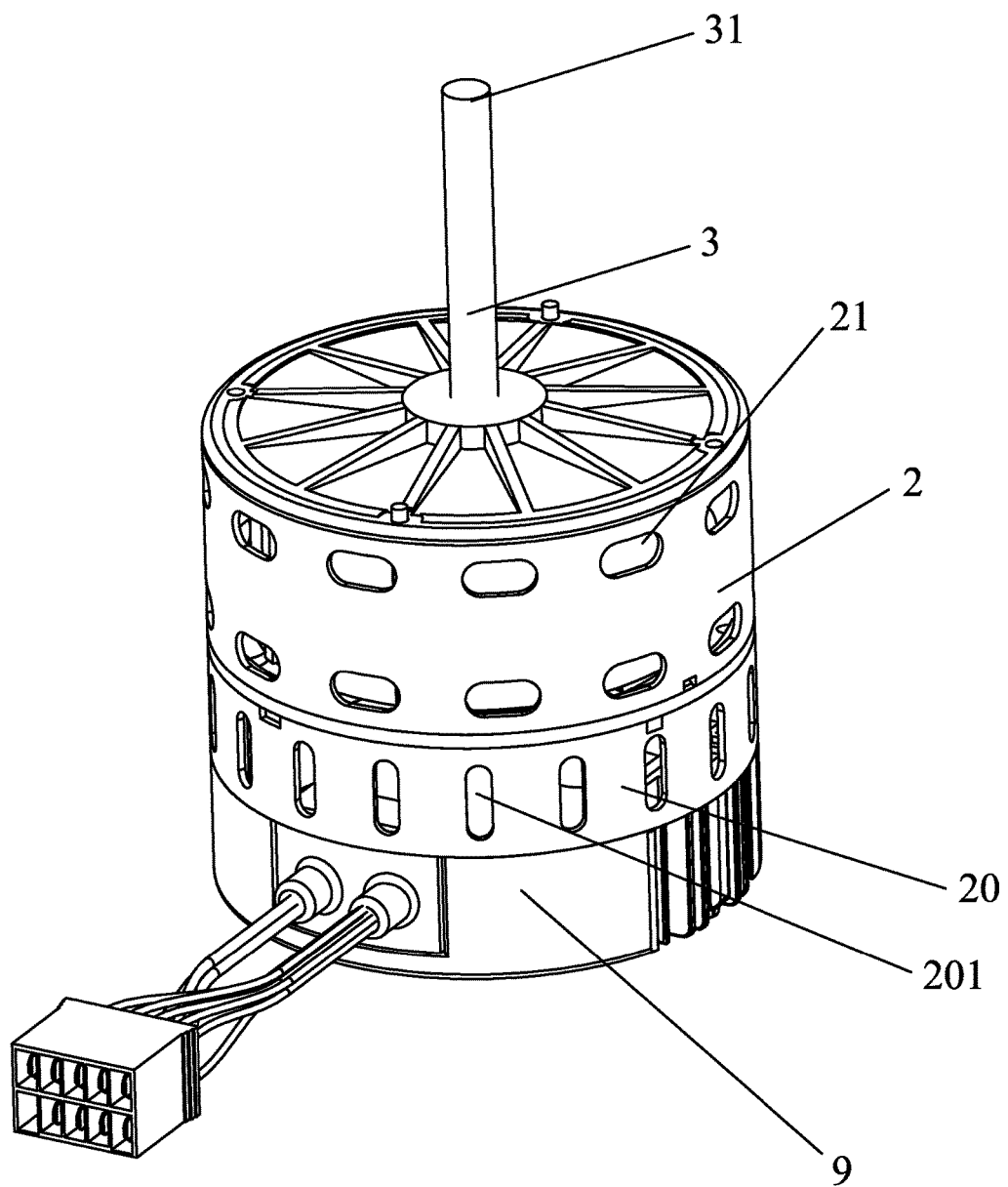
FIG. 1 is a stereogram of an external rotor motor in accordance with one embodiment of the present disclosure.
Figure 2:
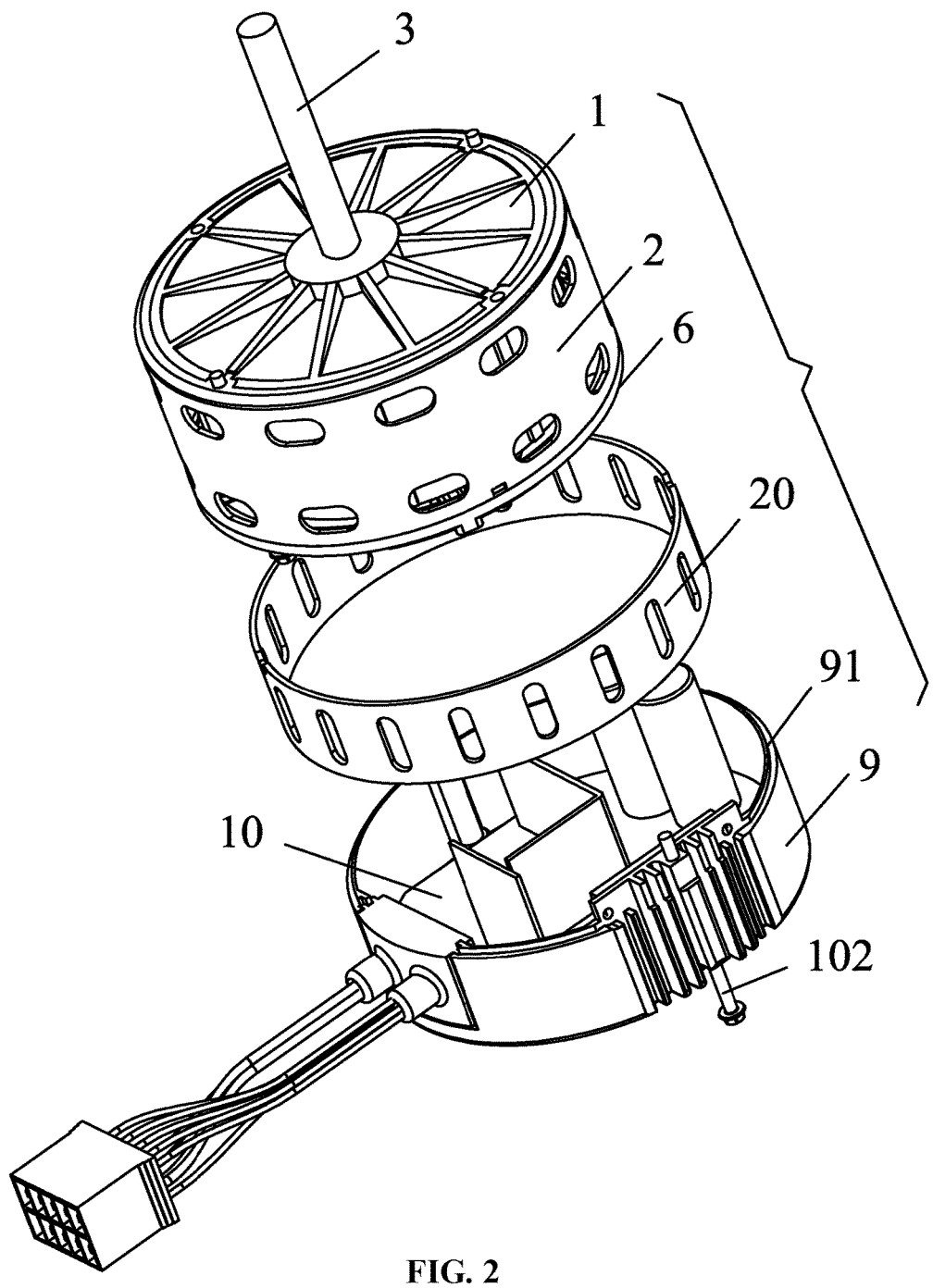
FIG. 2 is an exploded view of an external rotor motor in accordance with one embodiment of the present disclosure.
Figure 3:
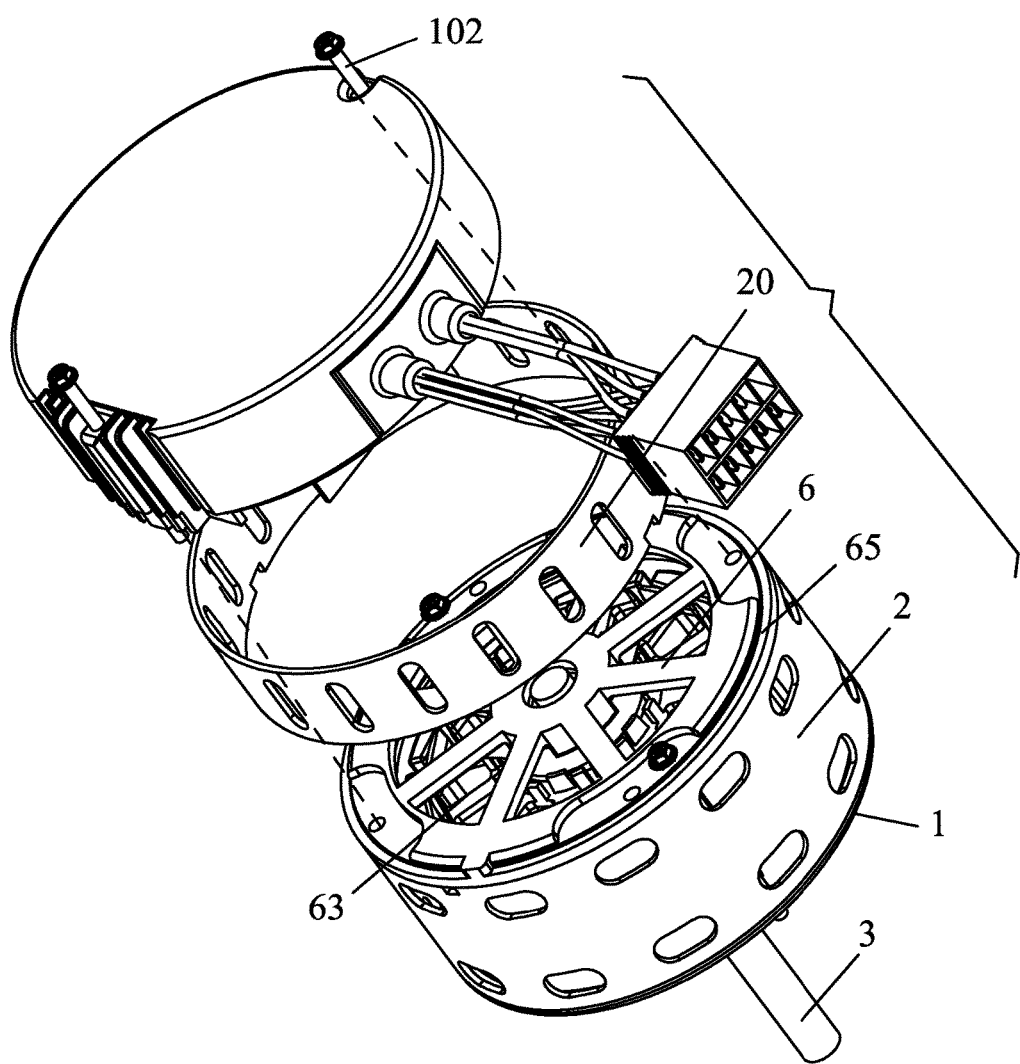
FIG. 3 is another exploded view of an external rotor motor in accordance with one embodiment of the present disclosure.
Figure 4:
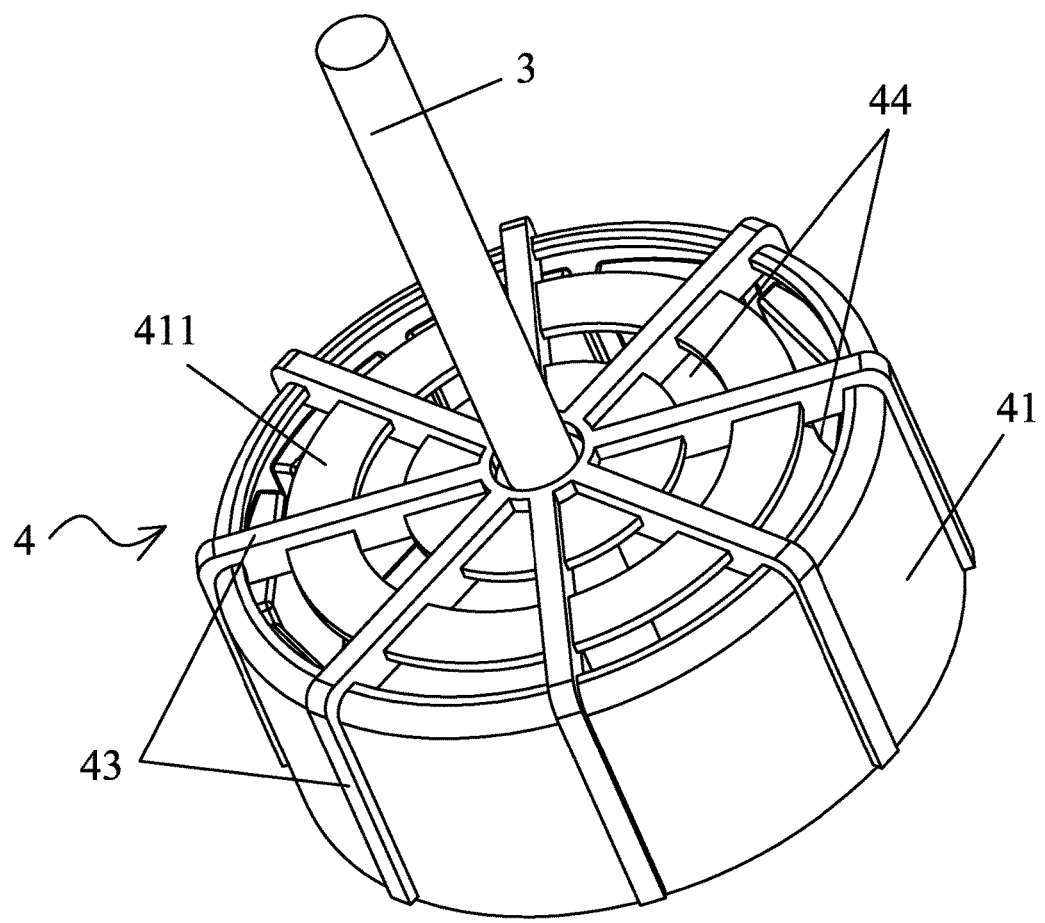
FIG. 4 is a stereogram of an external rotor in accordance with one embodiment of the present disclosure.
Figure 5:
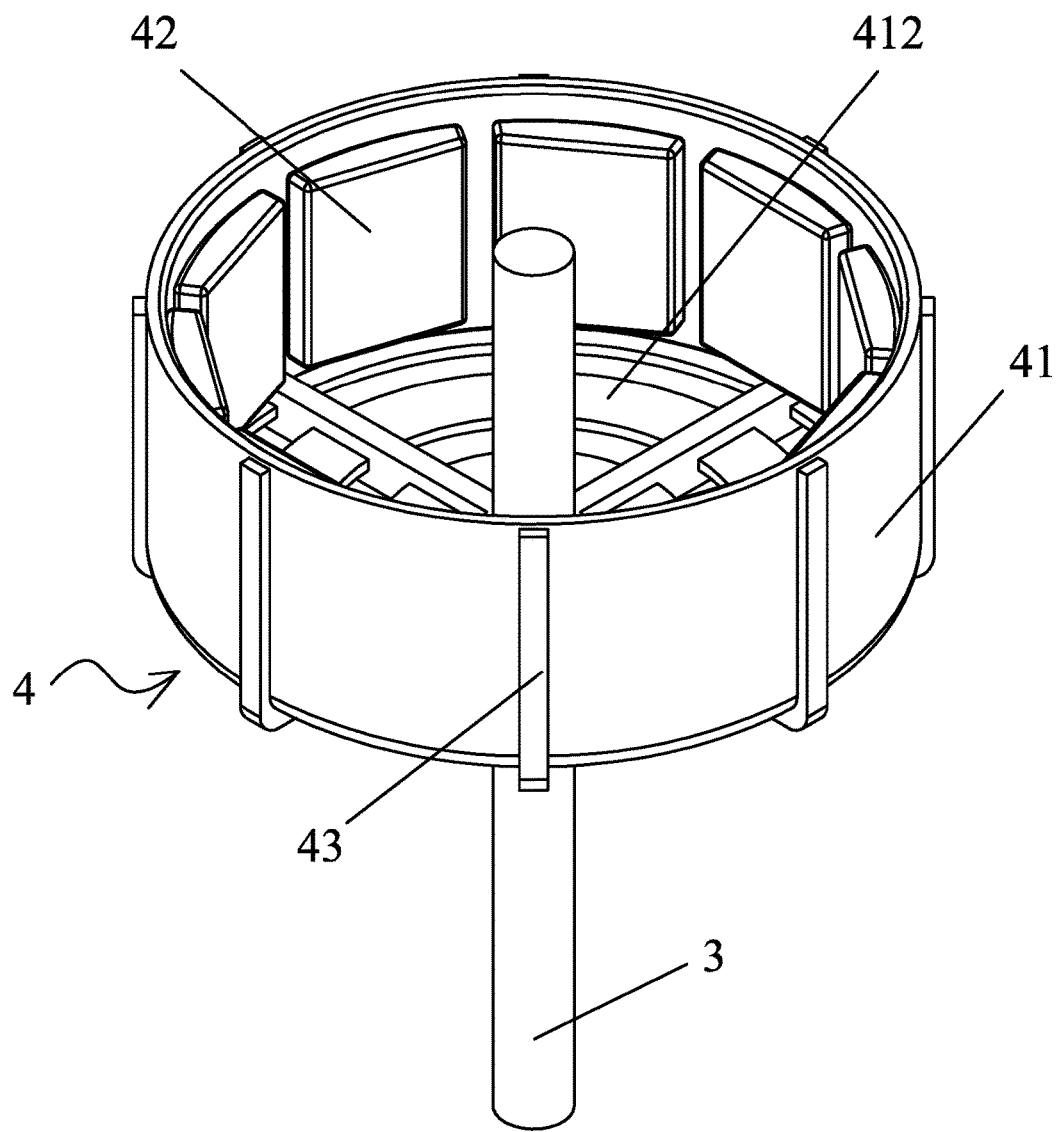
FIG. 5 is another stereogram of an external rotor in accordance with one embodiment of the present disclosure.
Figure 6:
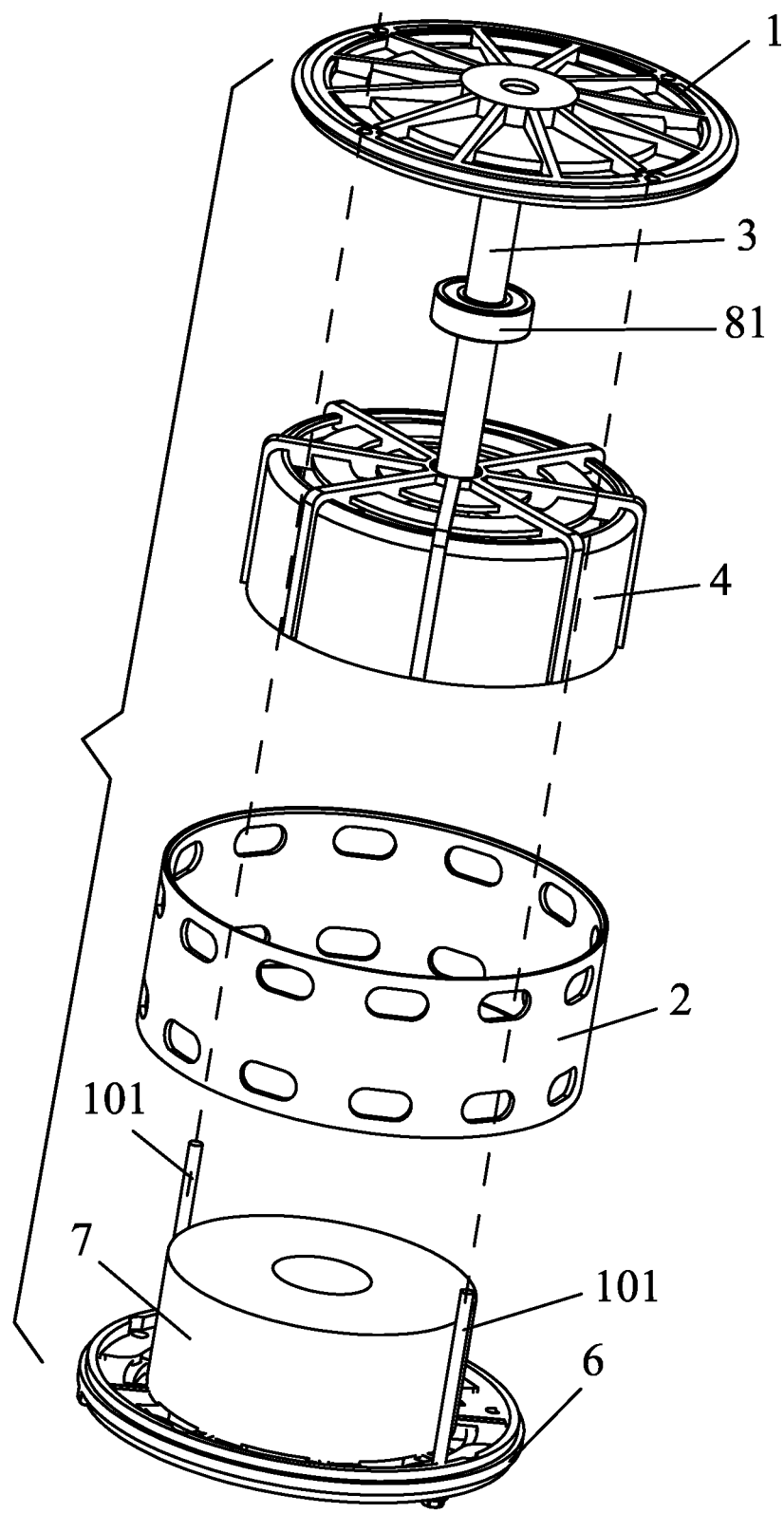
FIG. 6 is an exploded view of an external rotor motor excluding a control box and an auxiliary casing in accordance with one embodiment of the present disclosure.
Figure 7:
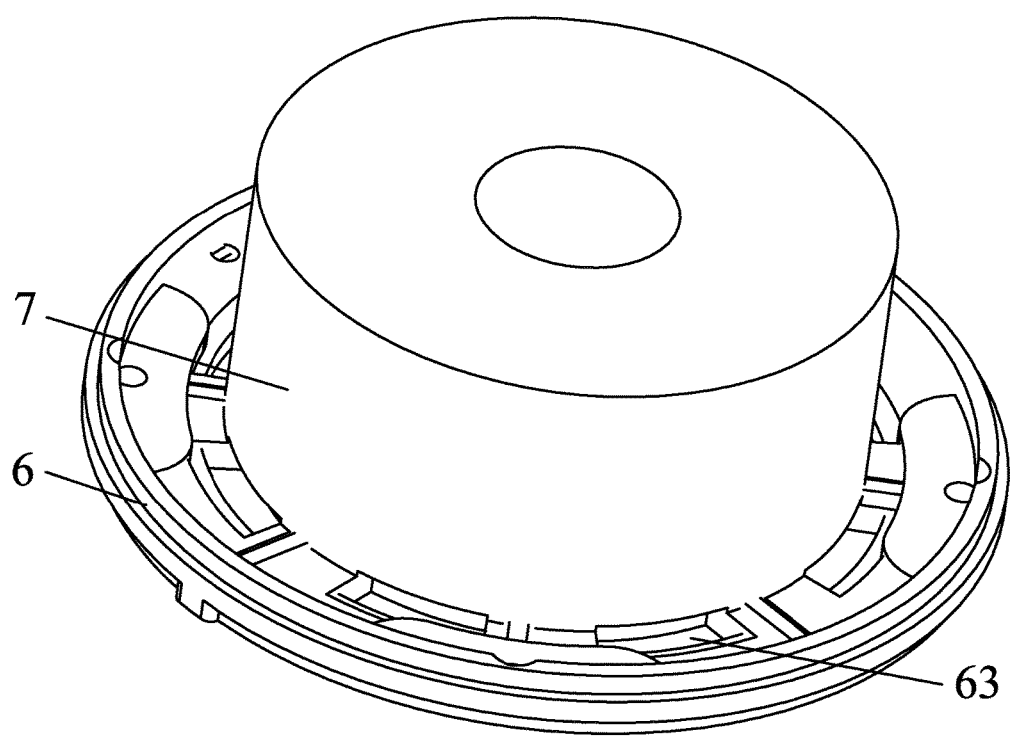
FIG. 7 is a stereogram of a plastic package of a stator assembly and a rear end cover in accordance with one embodiment of the present disclosure.
Figure 8:
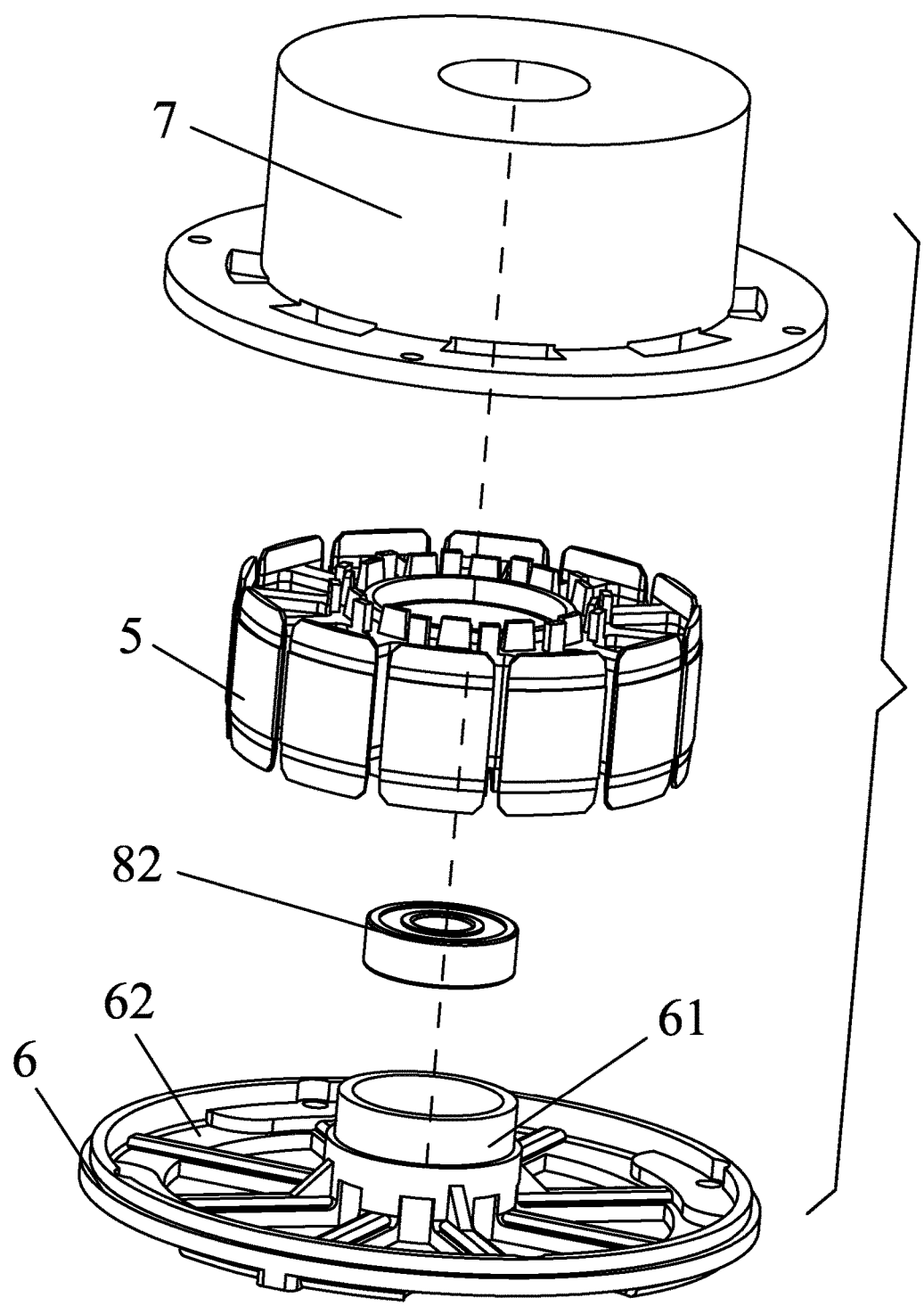
FIG. 8 is an exploded view of a plastic package in FIG. 7.
Figure 9:
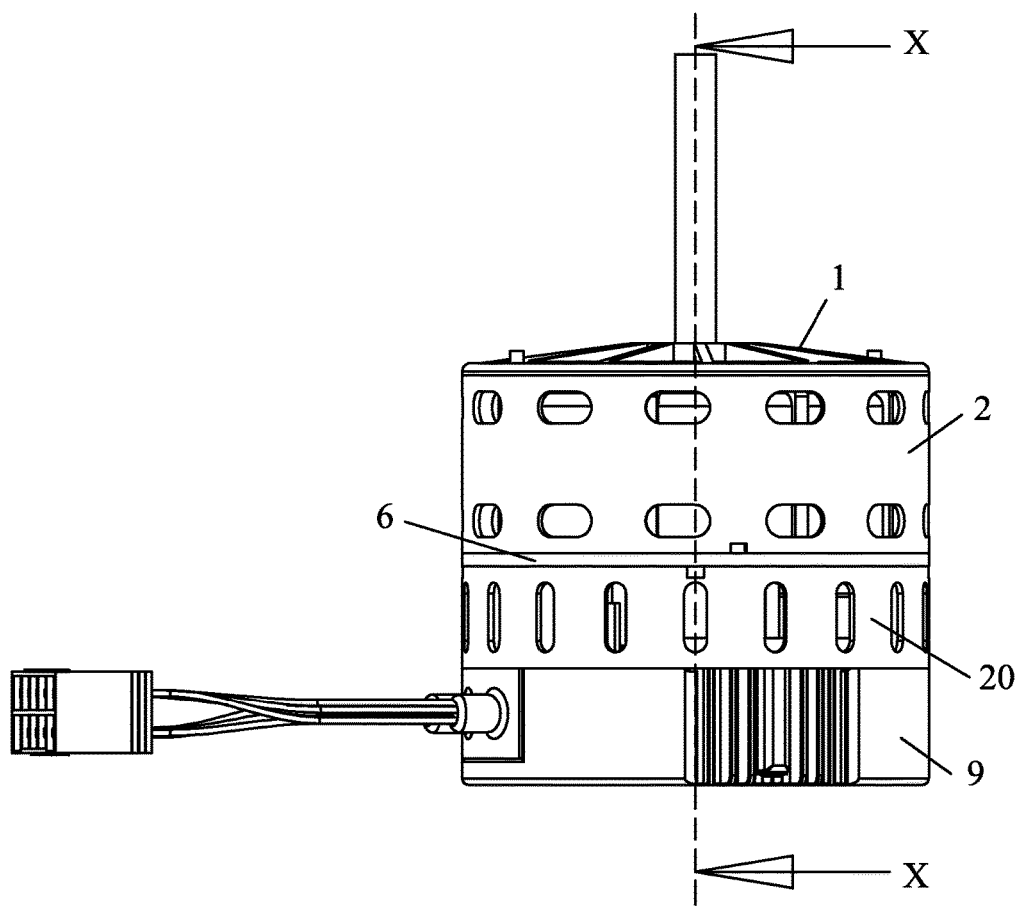
FIG. 9 is a schematic diagram of an external rotor in accordance with one embodiment of the present disclosure.
Figure 10:
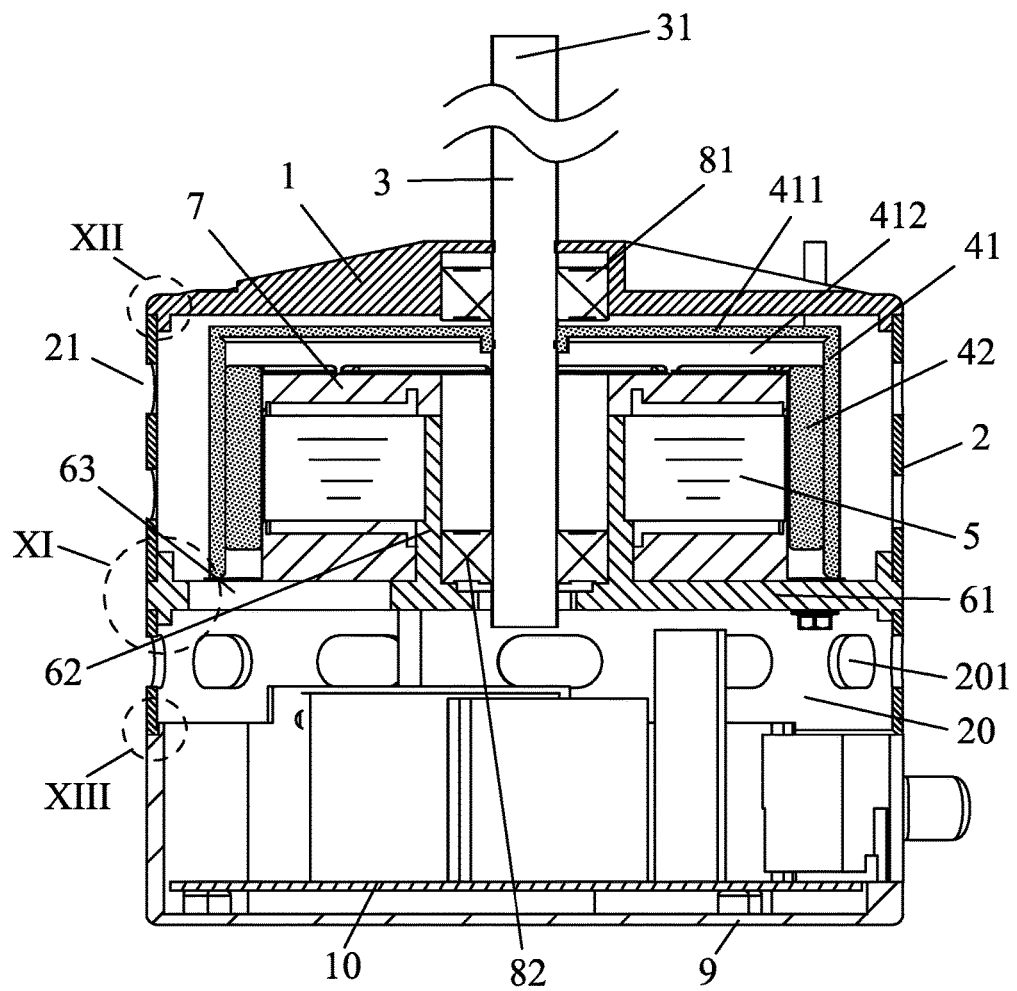
FIG. 10 is a sectional view taken from line X-X in FIG. 9.
Figure 11:
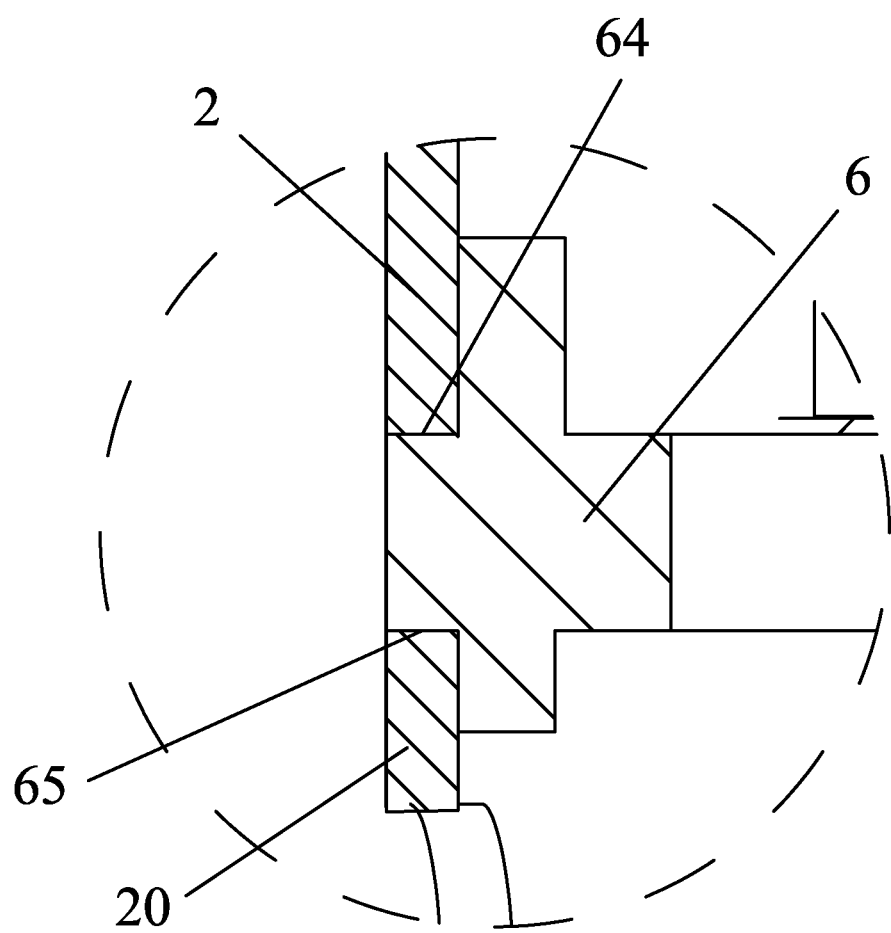
FIG. 11 is a local enlarged view of part XI in FIG. 10.
Figure 12:
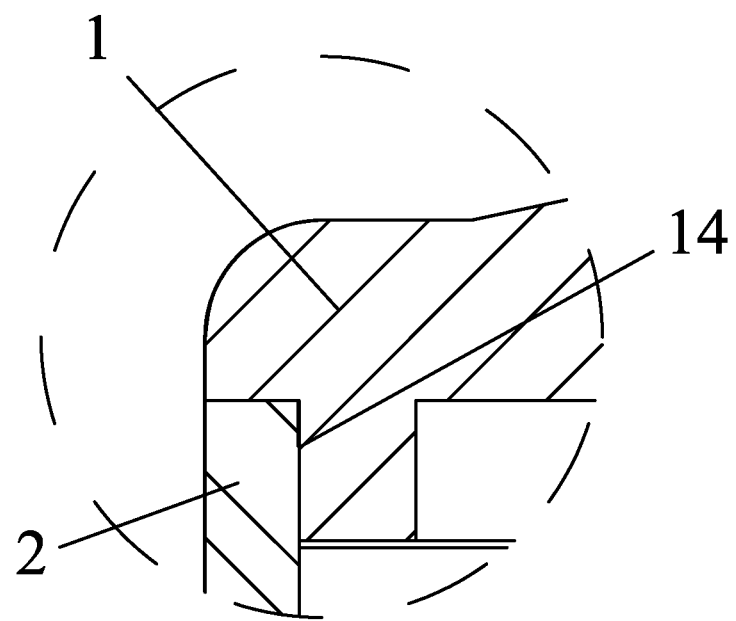
FIG. 12 is a local enlarged view of part XII in FIG. 11.
Figure 13:
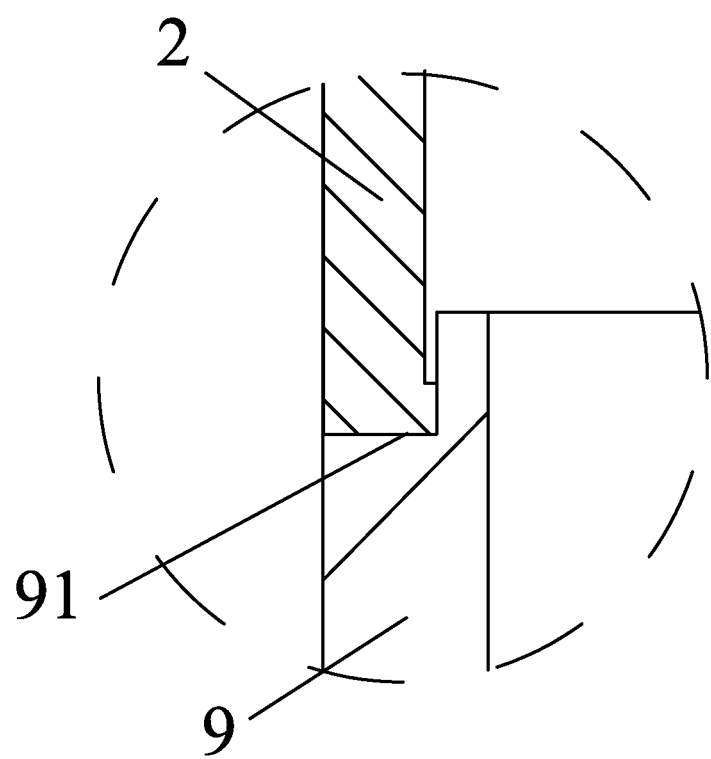
FIG. 13 is a local enlarged view of part XIII in FIG. 11.

For further illustrating the invention, experiments detailing an external rotor motor and a draught fan comprising the same are described below.

As shown in FIGS. 1-13, an external rotor motor, comprises a front end cover 1, a rear end cover 6, a sleeve casing 2, a rotary shaft 3, a stator assembly 5, and an external rotor assembly 4. The front end cover comprising a first bearing chamber in which a front bearing 81 is disposed. The front end cover 1 and the rear end cover 6 are disposed at two ends of the sleeve casing 2, respectively; the external rotor assembly 4 is disposed on and integrated with the rotary shaft 3; the rear end cover 6 comprises a cover body 62 and a sleeve base 61 protruding upwards from the cover body 62; the sleeve base 61 comprises a second bearing chamber in which a rear bearing 82 is disposed; the stator assembly 5 sleeves the sleeve base 61; the external rotor assembly 4 is disposed in the sleeve casing 2 and sleeves the stator assembly 5; the rotary shaft 3 comprises a head, a middle part, and a tail; the tail of the rotary shaft 3 is supported by the rear bearing 82 on the rear end cover 6; the middle part of the rotary shaft 3 is supported by the front bearing 81 on the front end cover 1; and the head of the rotary shaft 3 extends out of the front end cover 1 to form a shaft extension connected to a load.

The stator assembly 5 comprises a stator core, a terminal insulator, and coil windings; a through hole is provided in a center of the stator core, the sleeve base 61 is disposed in the through hole, and the stator assembly 5 is integrated with the rear end cover 6 and is packaged using a plastic-packaged body 7.

The external rotor assembly 4 comprises a sleeve 41 and a plurality of permanent magnets 42; the sleeve 41 comprises a side wall, a top plate 411, a chamber 412 formed by the side wall, and a bottom opening; the plurality of permanent magnets 42 is circumferentially disposed on the side wall; an axle hole is disposed in a center of the top plate 411; and the middle part of the rotary shaft is disposed in the axle hole and is integrated with the sleeve 41. A part of each air blade is located on a surface of the top plate 411, and the other part of each air blade is located on a surface of an outer wall of the sleeve 41. The top plate 411 comprises a plurality of ventilation holes 44. This accelerates the circulation and convection of the air, and speeds up the heat dissipation.

The front end cover 1 and the rear end cover 6 are connected to one another via a bolt and nut mechanism, and are disposed on two ends of the sleeve casing 2, respectively. A control box 9 comprising a control circuit board 10 is disposed on the rear end cover 6. An auxiliary casing 20 is disposed between the rear end cover 6 and the control box 9; and a side wall of the auxiliary casing 20 is provided with an air inlet 201. The front end cover 1 and the rear end cover 6 are connected to one another via a bolt and nut mechanism, both the front end cover and the rear end cover 6 comprises through holes corresponding to one another, the bolts 101 pass through the through holes of the front end cover and the rear end cover 6 in sequence, and the nuts locks the front end cover and the rear end cover 6 in an axial direction.

The rear end cover 6 comprises ventilating slots 63, the sleeve casing 2 comprises air outlets 21, the ventilating slots 63 communicate with chambers of the auxiliary casing 20 and the sleeve casing 2, and the external rotor assembly 4 comprises air blades 43. The control box 9 is connected to and mounted with the rear end cover 6 via a bolt; the control box 9 comprises a fourth step stop 91, a bottom part of the rear end cover 6 is provided with a third step stop 65, and two ends of the auxiliary casing 20 are embedded in the third step stop and the fourth step stop, respectively. The front end cover 1 comprises a first step stop 14, the rear end cover 6 comprises a second step stop 64, and two ends of the sleeve casing 2 are embedded in the first step stop 14 and the second step stop 64, respectively. The bottom of the cover body 62 of the rear end cover 6 is provided with a screw hole, and the control box 9 is connected to and mounted with the rear end cover 6 via the bolt 102.

Figure 14:
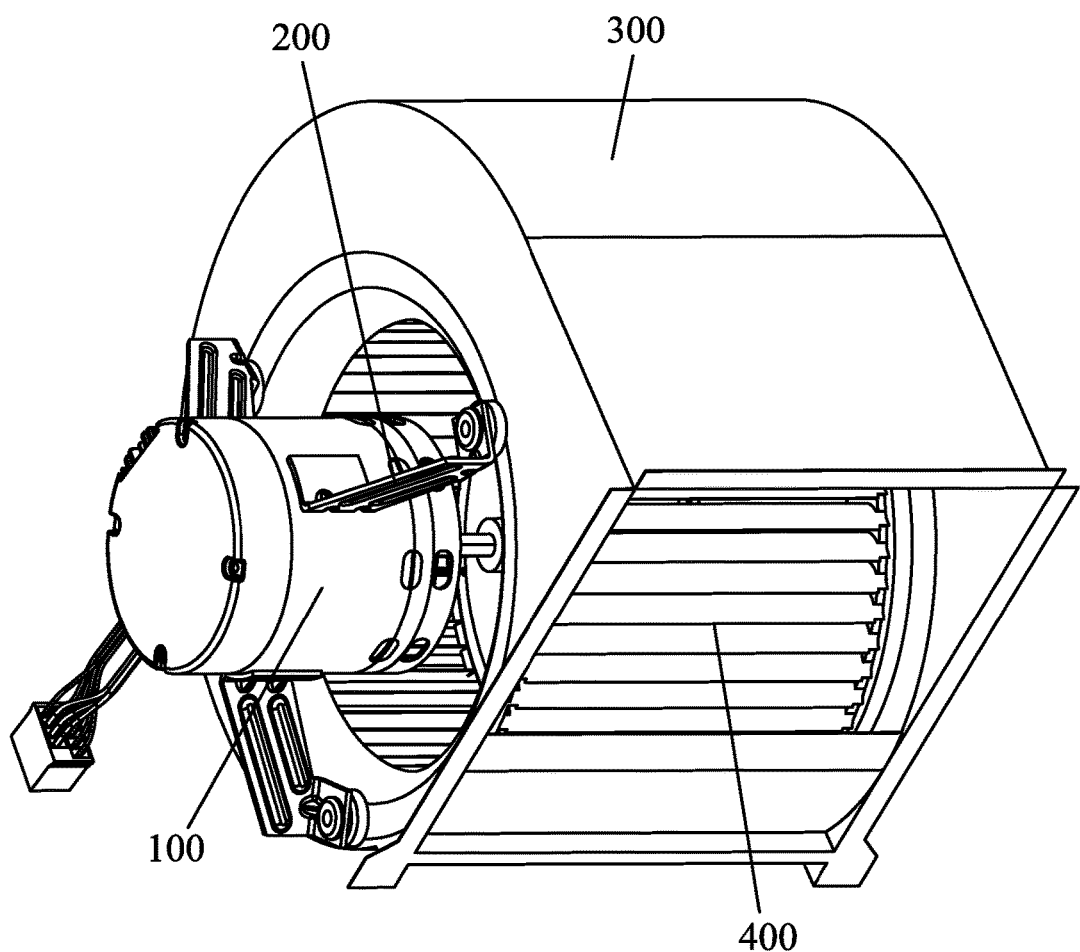
FIG. 14 is a stereogram of a draught fan in accordance with one embodiment of the present disclosure.

As shown in FIG. 14, a draught fan comprises: a volute 300, an external rotor motor 100, a wind wheel 400, and a plurality of installing supports 200. The volute comprises a chamber and the wind wheel 400 is disposed in the chamber; the plurality of installing supports 200 is close to an air inlet of the volute 300; one end of the plurality of installing supports 200 is connected to the volute 300, and the other end of the plurality of installing supports 200 is connected to the sleeve casing 2 of the external rotor motor; and the shaft extension 31 of the rotary shaft 3 extending out of the front end cover 1 is connected to the wind wheel 400.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An external rotor motor, comprising:
a front end cover, the front end cover comprising a first bearing chamber in which a front bearing is disposed;
a rear end cover;
a sleeve casing;
a rotary shaft;
a stator assembly; and
an external rotor assembly;
wherein
the front end cover and the rear end cover are disposed at two ends of the sleeve casing, respectively;
the external rotor assembly is disposed on and integrated with the rotary shaft;
the rear end cover comprises a cover body and a sleeve base protruding upwards from the cover body;
the sleeve base comprises a second bearing chamber in which a rear bearing is disposed;
the stator assembly sleeves the sleeve base;
the external rotor assembly is disposed in the sleeve casing and sleeves the stator assembly;
the rotary shaft comprises a head, a middle part, and a tail;
the tail of the rotary shaft is supported by the rear bearing on the rear end cover;
the middle part of the rotary shaft is supported by the front bearing on the front end cover; and
the head of the rotary shaft extends out of the front end cover to form a shaft extension connected to a load.

2. The motor of claim 1, wherein the stator assembly comprises a stator core, a terminal insulator, and coil windings; a through hole is provided in a center of the stator core, the sleeve base is disposed in the through hole, and the stator assembly is integrated with the rear end cover and is packaged by a plastic-packaged body.

3. The motor of claim 1, wherein the external rotor assembly comprises a sleeve and a plurality of permanent magnets; the sleeve comprises a side wall, a top plate, a chamber formed by the side wall, and a bottom opening; the plurality of permanent magnets is circumferentially disposed on the side wall; an axle hole is disposed in a center of the top plate; and the middle part of the rotary shaft is disposed in the axle hole and is integrated with the sleeve.

4. The motor of claim 2, wherein the external rotor assembly comprises a sleeve and a plurality of permanent magnets; the sleeve comprises a side wall, a top plate, a chamber formed by the side wall, and a bottom opening; the plurality of permanent magnets is circumferentially disposed on the side wall; an axle hole is disposed in a center of the top plate; and the middle part of the rotary shaft is disposed in the axle hole and is integrated with the sleeve.

5. The motor of claim 1, wherein the front end cover and the rear end cover are connected to one another via a bolt and nut mechanism, and are disposed on two ends of the sleeve casing, respectively.

6. The motor of claim 2, wherein the front end cover and the rear end cover are connected to one another via a bolt and nut mechanism, and are disposed on two ends of the sleeve casing, respectively.

7. The motor of claim 1, wherein a control box comprising a control circuit board is disposed on the rear end cover.

8. The motor of claim 2, wherein a control box comprising a control circuit board is disposed on the rear end cover.

9. The motor of claim 7, wherein an auxiliary casing is disposed between the rear end cover and the control box; and a side wall of the auxiliary casing is provided with an air inlet.

10. The motor of claim 8, wherein an auxiliary casing is disposed between the rear end cover and the control box; and a side wall of the auxiliary casing is provided with an air inlet.

11. The motor of claim 9, wherein the rear end cover comprises ventilating slots, the sleeve casing comprises air outlets, the ventilating slots communicate with chambers of the auxiliary casing and the sleeve casing, and the external rotor assembly comprises air blades.

12. The motor of claim 10, wherein the rear end cover comprises ventilating slots, the sleeve casing comprises air outlets, the ventilating slots communicate with chambers of the auxiliary casing and the sleeve casing, and the external rotor assembly comprises air blades.

13. The motor of claim 11, wherein a part of electronic elements of the control circuit board extend out of the control box to enter the chamber of the auxiliary casing.

14. The motor of claim 12, wherein a part of electronic elements of the control circuit board extend out of the control box to enter the chamber of the auxiliary casing.

15. The motor of claim 13, wherein the control box is connected to and mounted with the rear end cover via a bolt; the control box comprises a fourth step stop, the rear end cover is provided with a third step stop, and two ends of the auxiliary casing are embedded in the third step stop and the fourth step stop, respectively.

16. The motor of claim 14, wherein the control box is connected to and mounted with the rear end cover via a bolt; the control box comprises a fourth step stop, the rear end cover is provided with a third step stop, and two ends of the auxiliary casing are embedded in the third step stop and the fourth step stop, respectively.

17. The motor of claim 2, wherein the front end cover comprises a first step stop, the rear end cover comprises a second step stop, and two ends of the sleeve casing are embedded in the first step stop and the second step stop, respectively.

18. The motor of claim 11, wherein a part of each air blade is located on a surface of the top plate, and the other part of each air blade is located on a surface of an outer wall of the sleeve.

19. The motor of claim 1, wherein the top plate comprises a plurality of ventilation holes.

20. A draught fan, comprising: a volute comprising an air inlet, an external rotor motor of claim 1, a wind wheel, and a plurality of installing supports; wherein the volute comprises a chamber and the wind wheel is disposed in the chamber; the plurality of installing supports is close to the air inlet of the volute; one end of the plurality of installing supports is connected to the volute, and the other end of the plurality of installing supports is connected to the sleeve casing of the external rotor motor; and the shaft extension of the rotary shaft extends out of the front end cover and connects to the wind wheel.

* * * * *